US008704819B2

(12) United States Patent
Ogawa et al.

(10) Patent No.: US 8,704,819 B2
(45) Date of Patent: Apr. 22, 2014

(54) DISPLAY DEVICE AND METHOD FOR DRIVING SAME

(75) Inventors: Yasuyuki Ogawa, Osaka (JP); Seiji Kaneko, Osaka (JP); Kaoru Yamamoto, Osaka (JP); Kohhei Tanaka, Osaka (JP); Seiichi Uchida, Osaka (JP); Yutaka Takamaru, Osaka (JP); Shigeyasu Mori, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/989,486

(22) PCT Filed: Aug. 29, 2012

(86) PCT No.: PCT/JP2012/071782
§ 371 (c)(1),
(2), (4) Date: May 24, 2013

(87) PCT Pub. No.: WO2013/035594
PCT Pub. Date: Mar. 14, 2013

(65) Prior Publication Data
US 2014/0022234 A1 Jan. 23, 2014

(30) Foreign Application Priority Data

Sep. 6, 2011 (JP) ................................. 2011-194397

(51) Int. Cl.
*G09G 5/00* (2006.01)
(52) U.S. Cl.
USPC ............................................. 345/213; 345/98
(58) Field of Classification Search
USPC ............................ 345/204, 211–213, 98–100
See application file for complete search history.

(56) References Cited

U.S. PATENT DOCUMENTS

| 7,196,701 | B2* | 3/2007 | Tsutsui et al. ................. 345/211 |
| 7,493,531 | B2* | 2/2009 | Ito et al. ......................... 714/708 |
| 2001/0030645 | A1 | 10/2001 | Tsutsui et al. |
| 2002/0093473 | A1 | 7/2002 | Tanaka et al. |
| 2003/0020699 | A1 | 1/2003 | Nakatani et al. |
| 2012/0013580 | A1* | 1/2012 | Lin et al. ........................ 345/204 |

FOREIGN PATENT DOCUMENTS

| JP | 04-323691 A | 11/1992 |
| JP | 2001-282164 A | 10/2001 |

(Continued)

OTHER PUBLICATIONS

Machine English Translation for JP 2005-140959, Nov. 15, 2013, pp. 1-7.*

(Continued)

*Primary Examiner* — Jimmy H Nguyen
(74) *Attorney, Agent, or Firm* — Keating & Bennett, LLP

(57) ABSTRACT

There is provided a display device capable of displaying an image that barely changes with low power consumption on the basis of video data included in a transmitted command, and there is also provided a method for driving the same. A display timing controller (31) determines every frame period whether or not an externally transmitted command includes updated video data. As a result, when it is determined that no updated video data is included, screen refreshing is paused by not reading video data stored in frame memory (36). Moreover, when it is determined that updated video data is included, the screen refreshing is performed by reading video data stored in the frame memory (36).

15 Claims, 14 Drawing Sheets

(56) References Cited

FOREIGN PATENT DOCUMENTS

| | | |
|---|---|---|
| JP | 2002-207462 A | 7/2002 |
| JP | 2002-278523 A | 9/2002 |
| JP | 2003-044011 A | 2/2003 |
| JP | 2005-140959 A | 6/2005 |
| JP | 2007-240913 A | 9/2007 |

OTHER PUBLICATIONS

Official Communication issued in International Patent Application No. PCT/JP2012/071782, mailed on Oct. 2, 2012.

* cited by examiner

DISPLAY DEVICE AND METHOD FOR DRIVING SAME

TECHNICAL FIELD

The present invention relates to display devices and methods for driving the same, and the invention particularly relates to a small or medium-sized display device designed for low power consumption and a method for driving the same.

BACKGROUND ART

Conventional display devices perform screen refreshing at constant cycles (e.g., 60 Hz) even when displaying images which barely change, such as still images, on the screens, and therefore it is difficult to reduce their power consumption.

FIG. 14 is a diagram illustrating a conventional relationship between a host processor 90 (referred to below as a "host 90") and a display device 80. As shown in FIG. 14, the host 90 transmits video data and a mode-switching signal to the display device 80, and the display device 80 displays an image after switching the mode in which to perform screen refreshing on the basis of the received mode-switching signal. In response to the mode-switching signal, the display device 80 selects the cycle at which to perform screen refreshing from among a plurality of preset frequencies. For example, when there are preset selectable refresh modes A and B at 60 Hz and 30 Hz, respectively, the screen refreshing is performed either in mode A or B in accordance with the mode-switching signal transmitted by the host 90. In this manner, by performing screen refreshing while appropriately switching between modes A and B, it is rendered possible to reduce power consumption by the display device 80 compared to the case where screen refreshing is always performed in mode A.

Furthermore, Japanese Laid-Open Patent Publication No. 2002-207462 discloses a liquid crystal display device capable of reducing power consumption in displaying a still image. In this liquid crystal display device, a drive idle period is set to keep a driver circuit idle and maintain potentials of scanning lines and signal lines at fixed levels before transition from one frame to another. As a result, the liquid crystal display device can reduce power consumption in displaying a still image.

CITATION LIST

Patent Document

Patent Document 1: Japanese Laid-Open Patent Publication No. 2002-207462

SUMMARY OF THE INVENTION

Problems to be Solved by the Invention

However, when the display device 80 shown in FIG. 14 displays a still image, the host 90 sets an operating mode and transmits a mode-switching signal to the display device 80, so that modes A and B cannot be flexibly switched therebetween in accordance with updating of the image to be displayed. Therefore, power consumption by the display device 80 is not significantly reduced.

Furthermore, in the liquid crystal display device disclosed in Japanese Laid-Open Patent Publication No. 2002-207462, neither a scanning line driver circuit nor a signal line driver circuit is set in idle mode when a still image is being displayed, so that power consumption by the liquid crystal display device is not significantly reduced.

Therefore, an objective of the present invention is to provide a display device capable of displaying an image that barely changes with low power consumption on the basis of video data included in a transmitted command, and also to provide a method for driving the same.

Solution to the Problems

A first aspect of the present invention is directed to a display device that refreshes a screen on a display panel on the basis of video data included in an externally transmitted command, the device including:

a reception circuit for receiving the command;

a display timing control circuit having a function of determining whether or not the command includes updated video data every predetermined period;

frame memory for storing the updated video data when the command is determined to include the updated video data; and a driver circuit for generating an image signal on the basis of the updated video data and outputting the image signal to the display panel along with a control signal, whereby the screen is refreshed, wherein, the display timing control circuit includes first refresh pausing means for pausing the refreshing of the screen in a second predetermined period immediately after a first predetermined period immediately preceding the time of determination that the command received during the first predetermined period includes no updated video data.

In a second aspect of the present invention, based on the first aspect of the invention, the display timing control circuit includes first refreshing means for, when the command received during the first predetermined period is determined to include the updated video data, causing a memory access circuit to read the updated video data stored in the frame memory and outputting the updated video data to the driver circuit during the second predetermined period, whereby the screen is refreshed.

In a third aspect of the present invention, based on the first aspect of the invention, further included are second refreshing means for, when the command received during the first predetermined period is determined to include the updated video data, causing the memory access circuit to read the updated video data stored in the frame memory and outputting the updated video data to the driver circuit during the second predetermined period, whereby the screen is refreshed in a shorter period than the second predetermined period, and second refresh pausing means for pausing the refreshing of the screen for the rest of the second predetermined period after the refreshing by the second refreshing means.

In a fourth aspect of the present invention, based on the second or third aspect of the invention, further included is a power circuit for supplying necessary power to the driver circuit, wherein, when pausing the refreshing of the screen, the display timing control circuit stops the memory access circuit and digital circuits included in the driver circuit from operating, and causes the power circuit and analog circuits included in the driver circuit to output less current than during the refreshing.

In a fifth aspect of the present invention, based on the fourth aspect of the invention, the driver circuit includes a scanning line driver circuit and a signal line driver circuit, analog circuits included in the signal line driver circuit are a D/A conversion circuit and an output buffer circuit, and digital circuits included in the signal line driver circuit are a shift register circuit and a sampling latch circuit.

In a sixth aspect of the present invention, based on the first aspect of the invention, further included is a pause counter for counting the number of consecutive pauses in the refreshing of the screen, wherein, when the number counted by the pause counter exceeds a maximum pause number preset as a maximum possible number of consecutive pauses, the display timing control circuit forcibly refreshes the screen regardless of whether or not the updated video data has been received.

In a seventh aspect of the present invention, based on the first aspect of the invention, further included is a pulse generation circuit for generating and outputting a pulse to the display timing control circuit every maximum pause period for which the refreshing of the screen is pausable, wherein, when the pulse generation circuit outputs the pulse, the display timing control circuit forcibly refreshes the screen regardless of whether or not the updated video data has been received.

In an eighth aspect of the present invention, based on the second aspect of the invention, when pausing the refreshing of the screen, the memory access circuit pauses the reading of the updated video data stored in the frame memory.

In a ninth aspect of the present invention, based on any of the first through third aspects of the invention, the display panel includes a plurality of pixel circuits arranged in a matrix, and the pixel circuits include thin-film transistors with their channel layers made of an oxide semiconductor.

In a tenth aspect of the present invention, based on the ninth aspect of the invention, further included is a backlight unit for illuminating the display panel from its back surface.

In an eleventh aspect of the present invention, based on any of the first through third aspects of the invention, the video data included in the command is updated irregularly.

In a twelfth aspect of the present invention, based on any of the first through third aspects of the invention, the predetermined period is a period necessary for updating one screen or an integral multiple of the period necessary for the updating.

In a thirteenth aspect of the present invention, based on any of the first through third aspects of the invention, the command is transmitted to the display device by an external host processor connected to the display device via a high-speed serial interface.

In a fourteenth aspect of the present invention, based on the fifth aspect of the invention, when pausing the refreshing of the screen, the display timing control circuit sets bias current in the analog circuits included in the signal line driver circuit to be lower than during the refreshing of the screen.

In a fifteenth aspect of the present invention, based on the fourth aspect of the invention, when pausing the refreshing of the screen, the display timing control circuit sets a clock frequency of the power circuit to be lower than during the refreshing of the screen.

A sixteenth aspect of the present invention is directed to a method for driving a display device that refreshes a screen on a display panel on the basis of video data included in an externally transmitted command, the method including the steps of:

making a determination in a first predetermined period as to whether or not the command received during the first predetermined period includes updated video data; and when the updated video data is determined to be not included, pausing the refreshing of the screen in a second predetermined period immediately after the first predetermined period.

In a seventeenth aspect of the present invention, based on the sixteenth aspect of the invention, further included are the steps of, when the updated video data is determined to be included by the step of making a determination as to whether or not the command received during the first predetermined period includes the updated video data, causing a memory access circuit to read the updated video data during the second predetermined period, the data being stored to frame memory during the first predetermined period, and outputting the video data being read, along with a control signal, to a driver circuit for driving the display panel, whereby the screen is refreshed.

In an eighteenth aspect of the present invention, based on the sixteenth aspect of the invention, further included are the steps of, when the updated video data is determined to be included by the step of making a determination as to whether or not the command received during the first predetermined period includes the updated video data, causing a memory access circuit to read the updated video data and outputting the updated video data during the second predetermined period, the data being stored to frame memory during the first predetermined period, whereby the screen is refreshed in a shorter period than the second predetermined period, and after refreshing the screen in the shorter period than the second predetermined period, pausing the refreshing of the screen for the rest of the second predetermined period.

Effect of the Invention

According to the first and sixteenth aspects, it is determined every predetermined period whether or not an externally transmitted command includes updated video data, and when it is determined that no updated video data is included in a command received during the first predetermined period immediately preceding the time of determination, video data stored in the frame memory is not read, so that screen refreshing is paused in the second predetermined period. Thus, the display device can display an image that barely changes with low power consumption.

According to the second and seventeenth aspects, when it is determined that updated video data is included in a command received during the first predetermined period, the screen is refreshed in the second predetermined period by reading video data stored in the frame memory. Thus, the display device can refresh the screen on the basis of updated video data, and quickly display an image represented by the video data.

According to the third and eighteenth aspects, when it is determined that updated video data is included in a command received during the first predetermined period, the screen is refreshed at high speed, and once the screen refreshing is complete, the refreshing is paused for the rest of the second predetermined period. Thus, the display device can display an image represented by video data with lower power consumption.

According to the fourth aspect, when pausing the refreshing of the screen, the memory access circuit and the digital circuits included in the driver circuit, which are indispensable for screen refreshing, are stopped from operating, and the power circuit and the analog circuits included in the driver circuit are caused to output less current. Thus, power consumption by the display device during refresh pausing can be reduced.

According to the fifth aspect, the D/A conversion circuit and the output buffer circuit, which are analog circuits included in the signal line driver circuit, operate with less power at the time of refresh pausing than at the time of refreshing. Moreover, the shift register circuit and the sampling latch circuit, which are digital circuits included in the signal line driver circuit, stop operating at the time of refresh pausing. Thus, power consumption by the signal line driver circuit during refresh pausing can be reduced.

According to the sixth aspect, in the case where the refreshing is consecutively paused, when the number of pauses reaches or exceeds a certain value, the effect of leakage current cannot be ignored, and reduction in image display quality becomes noticeable. Therefore, the pause counter counts the number of consecutive pauses in refreshing, and the screen is forcibly refreshed when the number exceeds a preset maximum number of pauses. Thus, it is possible to prevent reduction in display quality of the display device.

According to the seventh aspect, in the case where the refreshing is consecutively paused, when the pause period lasts long, reduction in image display quality becomes noticeable as in the sixth aspect. Therefore, the pulse generation circuit for outputting a pulse every maximum pause period is provided such that the screen is refreshed upon output of the pulse. Thus, it is possible to prevent reduction in display quality of the display device.

According to the eighth aspect, when pausing the refreshing, the memory access circuit pauses the reading of video data stored in the frame memory. Thus, when the refreshing is paused, power consumption by the display device can be reduced.

According to the ninth aspect, the channel layer of the thin-film transistor in the pixel circuit is made of an oxide semiconductor, so that less leakage current occurs during off state. Thus, it is possible to increase the number of pauses allowed before forced refreshing, and it is also possible to lengthen the pause period, so that power consumption by the display device can be reduced.

According to the tenth aspect, in the case where the channel layer of the thin-film transistor is made of an oxide semiconductor, it is possible to keep leakage current low during off state even under exposure to backlight illumination by the backlight unit. Thus, it is possible to increase the number of pauses allowed before forced refreshing, and it is also possible to lengthen the pause period, so that power consumption by the display device can be reduced.

According to the eleventh aspect, even in the case where commands that include updated video data are received irregularly, it is possible to quickly sense whether or not a received command includes updated video data, so that power consumption by the display device can be reduced.

According to the twelfth aspect, the display device determines whether or not a received command includes updated video data, every lapse of a period necessary for refreshing one screen or a period of an integral multiple thereof. Thus, the screen can be refreshed at optimum times for video data that is updated at arbitrary times.

According to the thirteenth aspect, power consumption by the display device can be reduced also in the case where the display device receives a command that includes updated video data from a host processor connected by a high-speed serial interface.

According to the fourteenth aspect, when pausing the refreshing of the screen, bias current in the analog circuits included in the signal line driver circuit is set lower than during the refreshing of the screen. Thus, power consumption by the display device can be reduced.

According to the fifteenth aspect, when pausing the refreshing of the screen, the clock frequency of the power circuit is set lower than during the refreshing of the screen. Thus, power consumption by the display device can be reduced.

MODES FOR CARRYING OUT THE INVENTION

1. Outline of the Present Invention

Figure 1:
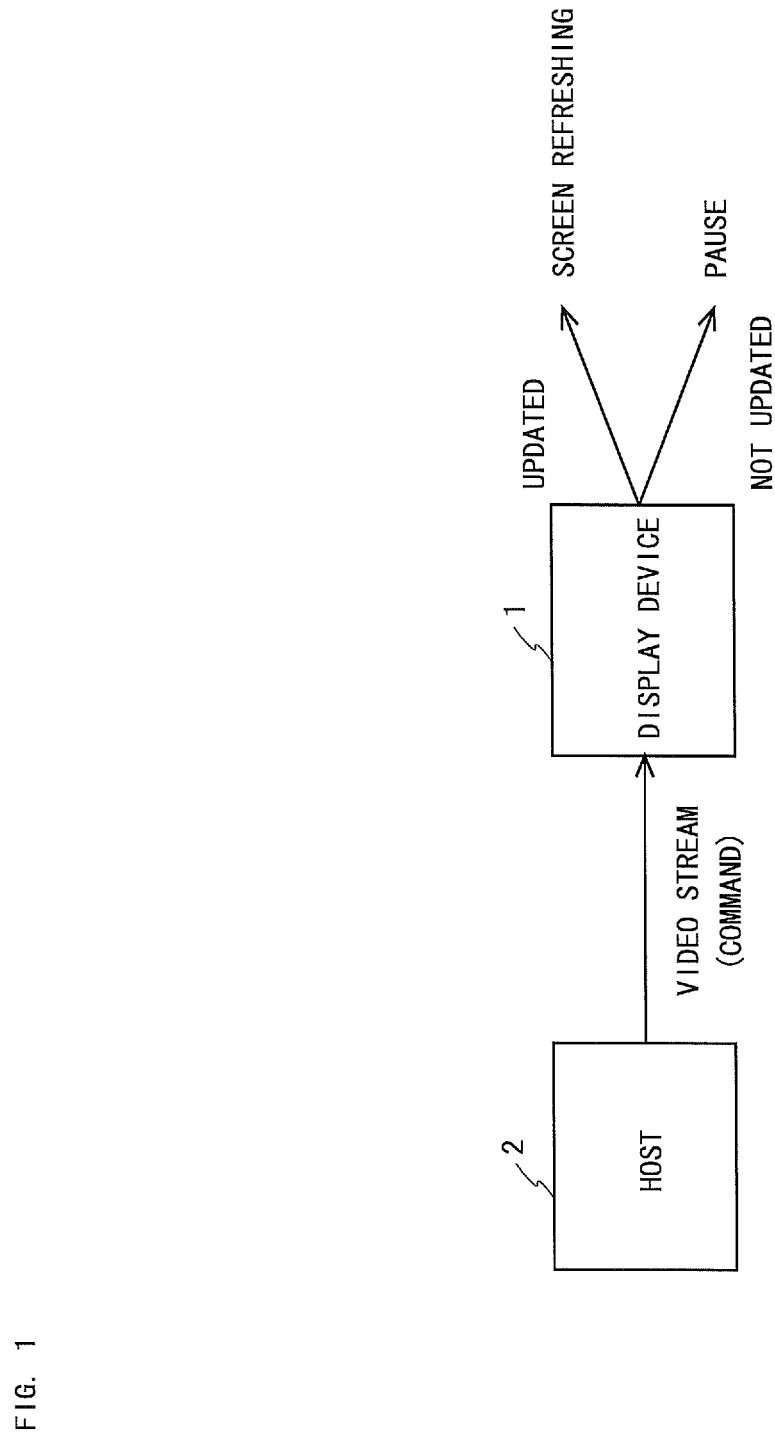
FIG. 1 is a diagram illustrating the relationship between a host and a display device, which is common among embodiments of the present invention.

FIG. 1 is a diagram illustrating the relationship between a host 2 and a display device 1, which is common among embodiments of the present invention. As shown in FIG. 1, the host 2 is connected to the display device 1 using a high-speed serial interface, so as to transmit image information to the display device 1 as a command including a packetized video stream. Upon reception of the command transmitted by the host 2, the display device 1 determines whether or not any updated video data is included therein. When updated video data is determined to be included, the video data is stored in the device.

At the beginning of each frame period, the display device 1 determines whether or not it has received any video data updated within an immediately preceding frame period (the period being equivalent to a period taken to update one screen). At this time, if any video data updated within an immediately preceding frame period has been received and stored as mentioned above, the display device 1 starts screen refreshing at the beginning of the frame period on the basis of the updated video data. Moreover, when it is determined that any video data updated within an immediately preceding frame period has not been received, screen refreshing is paused for that frame period in which the determination was made. In this manner, power consumption by the display device 1 displaying images that barely change such as still images is reduced.

For example, DSI (Display Serial Interface) is one of the attention-drawing high-speed serial interfaces. DSI is a standard proposed by the MIPI (Mobile Industry Processor Interface) Alliance, and can be applied to the present invention as well. Note that the present invention is not limited to DSI, and other high-speed serial interfaces can be used and applied as well.

Next, the features that realize the present invention will be specifically described in embodiments below. Note that unless otherwise specified in the following, screen refreshing is assumed to be performed at cycles of 60 Hz, i.e., one frame period is 16.7 msec. However, these are examples of the cycles and the frame period, and should not be construed as limiting.

2. First Embodiment

<2.1 Configuration of the Liquid Crystal Display Device>

Figure 2:
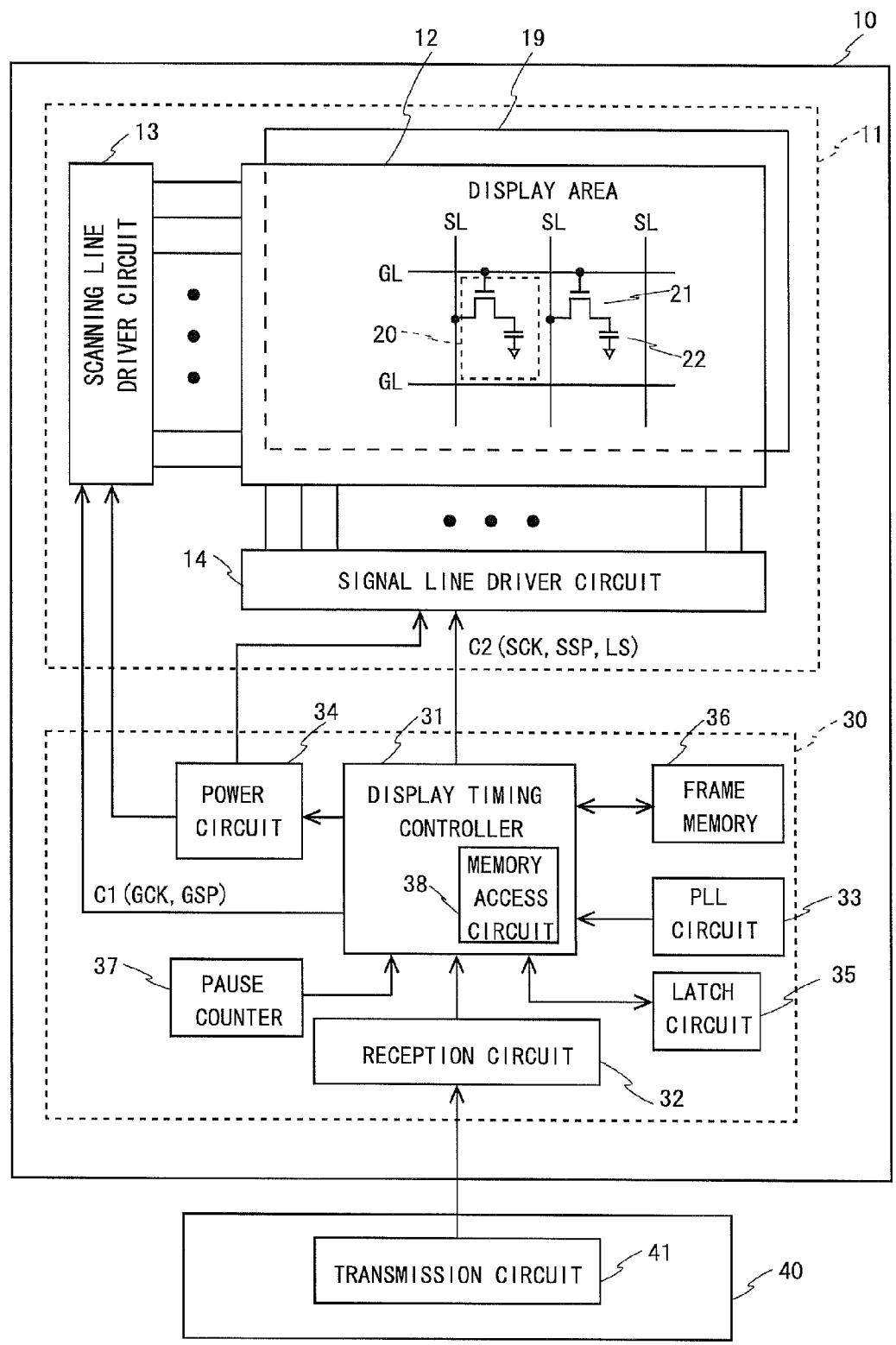
FIG. 2 is a block diagram illustrating the configuration of a liquid crystal display device according to a first embodiment of the present invention.

FIG. 2 is a block diagram illustrating the configuration of a liquid crystal display device 10 according to a first embodiment of the present invention. The liquid crystal display device 10 includes a liquid crystal display panel 11 formed on a transparent substrate made of glass or suchlike, a control board 30 that generates, for example, various control signals for driving the liquid crystal display panel 11 and video data corresponding to an image to be displayed on the liquid crystal display panel 11, and a backlight unit 19 that illuminates the liquid crystal display panel 11 from its back side.

The host 40 includes a CPU (Central Processing Unit) as its main component, and is adapted to transmit not only a command including video data but also various other commands from its transmission circuit 41 to the liquid crystal display device 10, the commands including, for example, a video timing command for generating a synchronization signal and a power control command for generating a sequence of turning the power ON/OFF.

The control board 30 is provided with a reception circuit 32 for receiving commands transmitted by the host 40, a PLL (Phase Locked Loop) circuit 33 for generating internal clock signals, a display timing controller 31 for generating various clock and synchronization signals on the basis of the internal clock signals generated by the PLL circuit 33, frame memory 36 for storing video data for one screen included in a command transmitted by the host 40, a power circuit 34 for supplying power to the scanning line driver circuit 13 and the signal line driver circuit 14, a latch circuit 35 for memorizing reception of video data updated within one frame period, and a pause counter 37 for memorizing the number of consecutive times screen refreshing is paused (a refresh pause number). Note that the display timing controller 31 is also referred to as the display timing control circuit, and the scanning line driver circuit 13 and the signal line driver circuit 14 are collectively referred to as the driver circuit.

The display timing controller 31 includes a memory access circuit 38 for reading video data stored in the frame memory 36. Moreover, the display timing controller 31 is connected to the reception circuit 32, the PLL circuit 33, the latch circuit 35, the frame memory 36, the power circuit 34, and the pause counter 37, so that these circuits are controlled by the display timing controller 31.

Note that the latch circuit 35 and the pause counter 37 may be included in the display timing controller 31. Moreover, a drive voltage of the signal line driver circuit 14 (e.g., 5V to 10V) is lower than a drive voltage of the scanning line driver circuit 13 (20V or more), and therefore, the signal line driver circuit 14 may generate a drive voltage using a clock signal provided by the display timing controller 31, without receiving power supplied by the power circuit 34.

The liquid crystal display panel 11 has a display area 12 formed for displaying an image by a plurality of pixel circuits 20 arranged in a matrix, and the liquid crystal display panel 11 also has a frame area surrounding the display area 12 where the scanning line driver circuit 13 is disposed for sequentially activating scanning lines GL and the signal line driver circuit 14 is disposed for generating an image signal, which is an analog signal, on the basis of video data, and supplying the signal to signal lines SL.

The display area 12 includes the scanning lines GL, the signal lines SL, and the pixel circuits 20. The scanning lines GL are arranged in parallel, and the signal lines SL are arranged in parallel so as to cross the scanning lines GL. The pixel circuits 20 are arranged near the intersections of the scanning lines GL and the signal lines SL. In this manner, the pixel circuits 20 are arranged in a matrix within the display area 12.

Each of the pixel circuits 20 includes a thin-film transistor 21 functioning as a switching element and having a gate terminal connected to the scanning line GL passing its corresponding intersection and a source terminal connected to the signal line SL passing that intersection, a pixel electrode connected to a drain terminal of the thin-film transistor 21, an opposing electrode provided commonly for the pixel circuits 20, and a liquid crystal layer sandwiched between the opposing electrode and the pixel electrode. The pixel electrode and the common electrode, along with the liquid crystal layer, constitute a pixel capacitance 22. Note that the pixel circuit 20 may be provided with an auxiliary capacitance in addition to the pixel capacitance 22.

Furthermore, the thin-film transistor 21 has a channel layer preferably made of a wide bandgap oxide semiconductor. The wide band gap reduces the number of carriers to be excited in the conduction band when the channel layer is illuminated by the backlight unit 19. As a result, significantly less leakage current occurs when the thin-film transistor 21 is in off state compared to the case where the thin-film transistor 21 has a channel layer made of amorphous silicon.

Note that the wide bandgap oxide semiconductor is typically InGaZnOx (IGZO) mainly composed of indium (In), gallium (Ga), zinc (Zn), and oxygen (O). However, the oxide semiconductor used in the present invention is not limited to IGZO, and includes, for example, at least one of the following: indium, gallium, zinc, copper (Cu), silicon (Si), tin (Sn), aluminum (Al), calcium (Ca), germanium (Ge), and lead (Pb).

By activating the scanning line GL, thin-film transistor 21 is brought into on state. As a result, an image signal is supplied from the signal line driver circuit 14 to the signal line SL, and held in the pixel capacitance 22 of the pixel circuit 20 connected to the activated scanning line GL. The liquid crystal layer changes its orientational state in accordance with the magnitude of the image signal held in the pixel capacitance 22, and the transmittance of light from the backlight unit 19 through the liquid crystal display panel 11 changes when the light is transmitted through the panel. In this manner, the liquid crystal display panel 11 displays an image based on video data that is included in a command transmitted by the host 40.

Next, the operation of the liquid crystal display device 10 will be described. The host 40 transmits a command including a packetized video stream of image information from the transmission circuit 41 to the liquid crystal display device 10. Upon reception of the command by the reception circuit 32 provided in the control board 30, the liquid crystal display device 10 provides the command to the display timing controller 31. The display timing controller 31 decodes the video stream included in the received command, and if updated video data is included, stores the video data to the frame memory 36.

Furthermore, the display timing controller 31 generates control signals C1 and C2 for controlling the scanning line driver circuit 13 and the signal line driver circuit 14, on the basis of internal clock signals generated by the PLL circuit 33. Then, the memory access circuit 38 reads video data from the frame memory 36 every frame period, and the display timing controller 31 transmits the data to the signal line driver circuit 14, and also transmits the control signals C1 and C2 to the scanning line driver circuit 13 and the signal line driver circuit 14, respectively. The control signal C1 consists of, for example, a source start pulse signal SSP, a source clock signal SCK, and a latch strobe signal LS. The control signal C2 consists of, for example, a gate start pulse signal GSP and a gate clock signal GCK.

<2.2 Operation of the Display Timing Controller>

Figure 3:
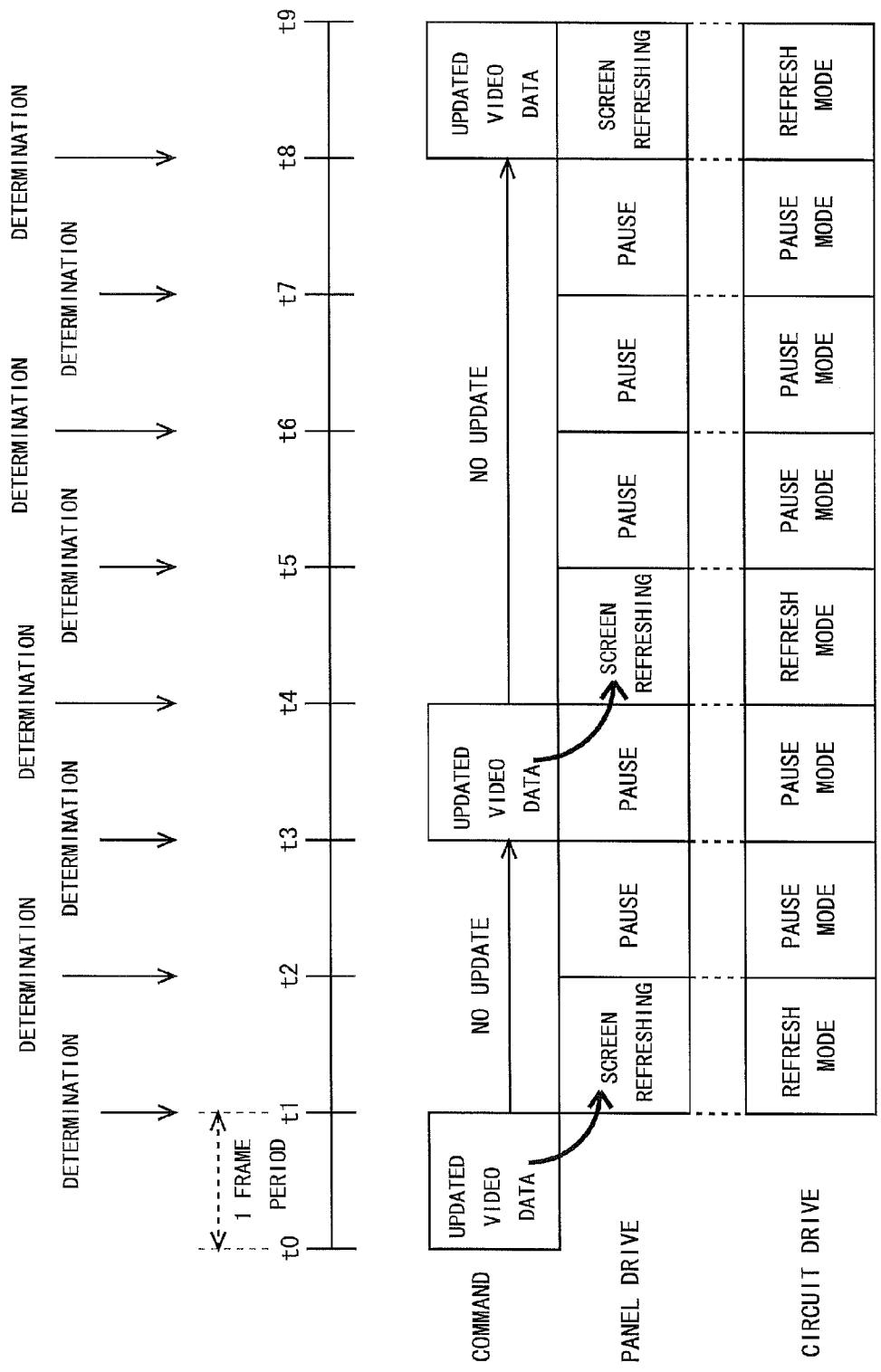
FIG. 3 is a diagram illustrating the relationship between updated video data included in a command transmitted by the host and screen refreshing in the liquid crystal display device shown in FIG. 2.

FIG. 3 is a diagram illustrating the relationship between updated video data included in a command transmitted by the host 40 and screen refreshing. In FIG. 3, each of the time intervals within the range from the period between time t0 and time t1 to the period between time t8 and time t9 is one frame period, and at each time ti (where i is an integer of from 1 to 9) within the range from time t1 to time t9, on the basis of a flag F of the latch circuit 35, it is determined whether or not a command received during an immediately preceding frame period includes updated video data. The operation of the display timing controller 31 will be specifically described below.

First, once a command transmitted by the host 40 is received during the period between time t0 and time t1, the display timing controller 31 decodes the command. As a result, when the command includes updated video data, during the period between time t0 and time t1, the flag F of the latch circuit 35 is set to "1", and the video data is stored to the frame memory 36.

Thereafter, at time t1, the display timing controller 31 determines whether or not the command that includes updated video data was received during the period between time t0 and time t1, on the basis of the flag F of the latch circuit 35. In this case, the display timing controller 31 detects that the flag F of the latch circuit 35 is "1", and therefore determines that the command that includes updated video data was received during the period between time t0 and time t1. Next, the memory access circuit 38 reads video data from the frame memory 36, and outputs the video data to the signal line driver circuit 14, and control signals C1 and C2 to the scanning line driver circuit 13 and the signal line driver circuit 14, respectively. As a result, on the basis of the video data received during the period between time t0 and time t1, screen refreshing starts at time t1, and an image based on the video data is displayed until time t2.

Furthermore, during the period between time t1 and time t2, no command from the host 40 is received, and therefore the flag F of the latch circuit 35 is set to "0". Accordingly, at time t2, the display timing controller 31 detects that the flag F memorized in the latch circuit 35 is "0", any command that includes updated video data was not received during the period between time t1 and time t2. As a result, the display timing controller 31 pauses screen refreshing from time t2 to time t3, and continues to display the same image as that displayed from time t1 to time t2.

Similarly, no command that includes updated video data is received during the period between time t2 and time t3. Accordingly, the display timing controller 31 also pauses screen refreshing from time t3 to time t4, and continues to display the same image as that displayed from time t1 to time t2.

Furthermore, when a command that includes updated video data is received during the period between time t3 and time t4, the display timing controller 31 sets the flag F of the latch circuit 35 to "1", and updates the video data stored in the frame memory 36 to the newly received video data.

Thereafter, at time t4, when the display timing controller 31 detects that the flag F of the latch circuit 35 is "1", the memory access circuit 38 reads the video data from the frame memory 36, and the display timing controller 31 outputs the video data to the signal line driver circuit 14, and also outputs control signals C1 and C2 to the scanning line driver circuit 13 and the signal line driver circuit 14, respectively. As a result, on the basis of the video data received during the period between time t3 and time t4, screen refreshing starts at time t4, and an image based on the video data is displayed until time t5.

Next, during each period between time t4 and time t8, the liquid crystal display device 10 receives no command that includes updated video data. Accordingly, the display timing controller 31 pauses screen refreshing during each period between time t5 and time t8, and continues to display the same image as that displayed from time t4 to time t5.

In the liquid crystal display device 10, the maximum number of times refreshing can be paused (a maximum refresh pause number) is set at 3. Accordingly, if refreshing is also paused from time t8 to time t9, the refresh pause number is 4, which is greater than the maximum refresh pause number. Therefore, even when no command that includes updated video data is received during the period between time t7 and time t8, the display timing controller 31 forcibly performs screen refreshing from time t8 to time t9. Specifically, the display timing controller 31 reads again the video data received during the period between time t3 and time t4 and stored in the frame memory 36, and outputs the video data to the signal line driver circuit 14 and control signals C1 and C2 to the scanning line driver circuit 13 and the signal line driver circuit 14, respectively. As a result, the same image as that displayed during the pause period from time t7 to time t8 is displayed. Note that the maximum refresh pause number as mentioned above is an example, and can be changed where necessary.

In this manner, screen refreshing is performed even when no command that includes updated video data is received, and the reason for this is as follows. Specifically, if the period for which screen refreshing is paused becomes longer, leakage current, which occurs, for example, when the thin-film transistor 21 is in off state or due to impurities contained in the liquid crystal material, weakens image signals held in the pixel capacitances 22, leading to reduced display quality. Therefore, in the liquid crystal display device 10, to prevent reduction in display quality, screen refreshing is forcibly performed even when no command that includes updated video data is received during three consecutive frame periods.

In this case, the maximum number of times screen refreshing can be consecutively performed is preset. The pause counter 37 counts the number of consecutive pauses in refreshing, and when the number of pauses in refreshing exceeds the maximum possible number of pauses, screen refreshing is forcibly performed on the basis of video data stored in the frame memory 36 even if no updated video data is received.

Note that by forming the channel layer of the thin-film transistor 21 using an oxide semiconductor such as IGZO, leakage current can be reduced when the thin-film transistor 21 is in off state, so that the time until display quality is reduced due to image signals being weakened can be lengthened. Thus, the maximum number of pauses can be set to a larger value, resulting in lower power consumption by the liquid crystal display device 10.

Furthermore, as for conventional display devices, refreshing timing is determined by a mode-switching signal, and the timing of screen refreshing cannot be flexibly changed even if updated video data is received. On the other hand, as for the liquid crystal display device 10, on the basis of the flag F of the latch circuit 35, it is determined at the beginning of each frame period whether or not video data stored in the frame memory 36 was updated during an immediately preceding frame period. As a result, when the video data is updated, screen refreshing is performed at the beginning of the frame period on the basis of the video data. Therefore, screen refreshing can be performed at optimum times for video data that is updated at arbitrary times. Thus, the liquid crystal display device 10 can further reduce power consumption.

Furthermore, when a command provided by the reception circuit 32 includes updated video data, the display timing controller 31 is required to supply necessary power to the power circuit 34, the scanning line driver circuit 13, the signal line driver circuit 14, and the memory access circuit 38, which are indispensable for screen refreshing. The mode in which to perform screen refreshing by supplying necessary power in such a manner is called the refresh mode. Moreover, when the command does not include any updated video data, the display timing controller 31 pauses screen refreshing, and allows the liquid crystal display device 10 to operate with minimum necessary power. The mode in which to pause screen refreshing as such is called the pausing mode.

Figure 4:
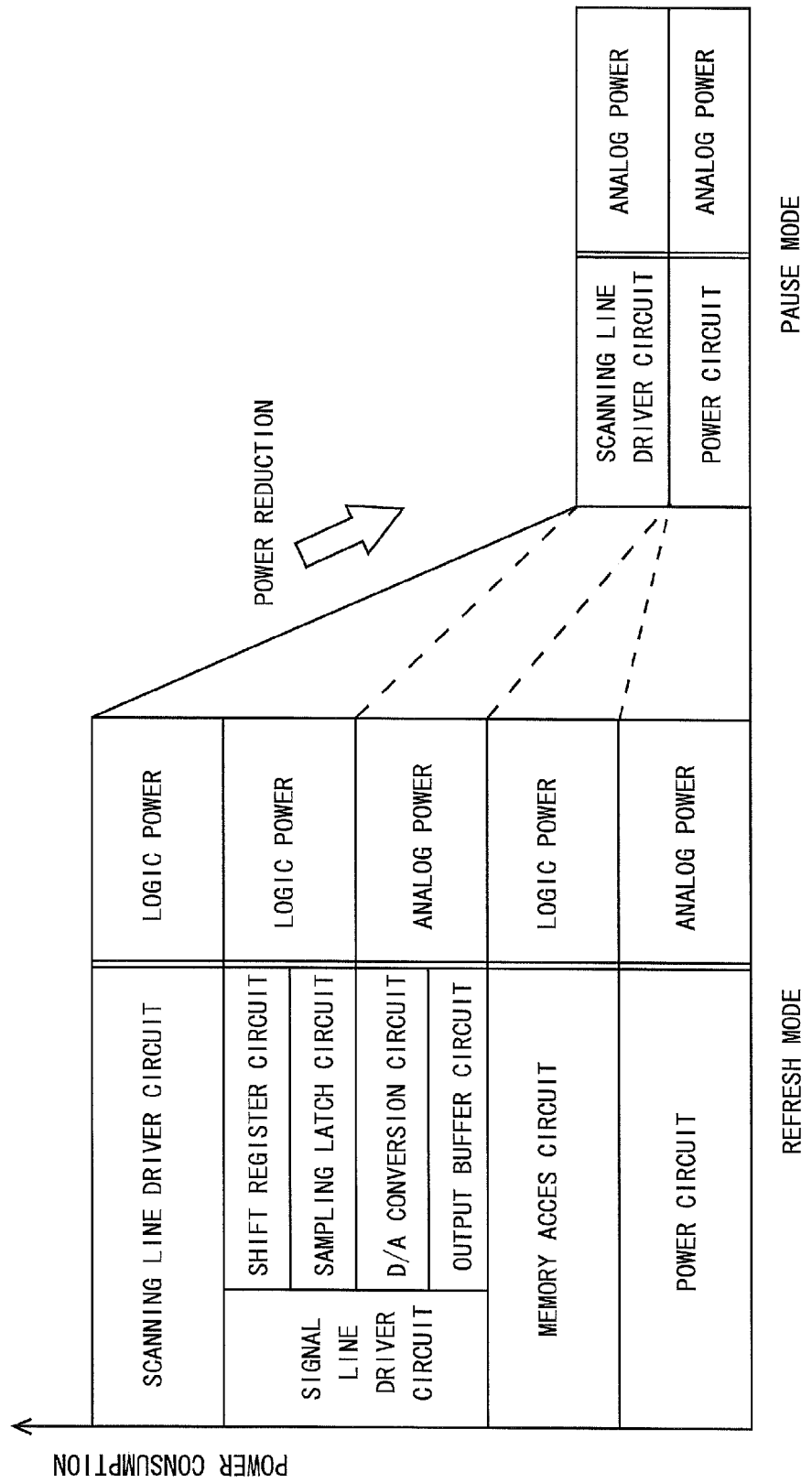
FIG. 4 is a diagram illustrating the relationship between circuits operating in a refresh mode and/or a pause mode and their power consumption in the liquid crystal display device shown in FIG. 2.

FIG. 4 is a diagram illustrating the relationship between circuits operating in the refresh mode and/or the pause mode and their power consumption. As shown in FIG. 4, the circuits involved in the refresh mode or the pause mode are the scanning line driver circuit 13, the signal line driver circuit 14, the power circuit 34 for supplying power to these circuits, and the memory access circuit 38 provided in the display timing controller 31.

As shown in FIG. 4, the signal line driver circuit 14 includes a shift register circuit, a sampling latch circuit, a D/A conversion circuit, and an output buffer circuit, and different circuits operate in the refresh mode and the pause mode.

Among the circuits shown in FIG. 4, the scanning line driver circuit 13, the shift register circuit and the sampling latch circuit included in the signal line driver circuit 14, and the memory access circuit 38 are logic circuits, and the D/A conversion circuit and the output buffer circuit included in the signal line driver circuit 14, and the power circuit 34 are analog circuits.

In the refresh mode, the scanning line driver circuit 13, the signal line driver circuit 14, the power circuit 34, and the memory access circuit 38 shown in FIG. 4 are caused to operate. On the other hand, in the pause mode, only the analog circuits: D/A conversion circuit; output buffer circuit; and power circuit 34, are caused to operate, and the digital circuits: scanning line driver circuit 13; memory access circuit 38; shift register circuit; and sampling latch circuit, are stopped from operating by control signals from the display timing controller 31.

As can be appreciated from FIG. 4, power to be supplied to the D/A conversion circuit and the output buffer circuit, which are the analog circuits in the signal line driver circuit 14, can be reduced in the pause mode compared to the refresh mode. The reason for this is as follows. In the period where screen refreshing is performed (the refresh period), to charge or discharge the signal line SL, which is a high capacitive load, in a short period of time, it is necessary to increase bias current in the D/A conversion circuit and the output buffer circuit. On the other hand, in the period where no refreshing is performed (the pause period), it is not necessary to charge or discharge the signal line SL, and therefore the bias current can be reduced to zero. However, if the bias current is zero, the analog circuits that operate in the pause period might be undesirably destabilized. Therefore, under control of the display timing controller 31, the bias current in the D/A conversion circuit and the output buffer circuit is set to be lower in the pause period than at the time of refreshing, but within the extent that it is greater than zero. As a result, power consumption by the D/A conversion circuit and the output buffer circuit can be reduced in the pause period compared to the refresh period.

Furthermore, the power circuit 34 supplies the signal line driver circuit 14 and the scanning line driver circuit 13 with voltages obtained by boosting clock signals with a charge pump. The signal line driver circuit 14 generates current for charging or discharging the signal line SL, on the basis of the voltage supplied by the power circuit 34. Therefore, in the refresh period, the power circuit 34 is required to supply the signal line driver circuit 14 with a voltage boosted using a high-frequency clock signal, so that power consumption by the power circuit 34 increases. However, in the pause period, there is no need for the signal line driver circuit 14 to generate the current for charging or discharging the signal line SL, which eliminates the need to supply high voltage. As a result, in the pause period, the power circuit 34 simply supplies the signal line driver circuit 14 with a voltage boosted using a low-frequency clock signal, so that power consumption by the power circuit 34 is lower than in the refresh period.

Furthermore, in the refresh period, the power circuit 34 is required to supply the scanning line driver circuit 13 with a high drive voltage (20V or more). On the other hand, in the pause period, to keep the potential of the scanning line GL constant, the scanning line driver circuit 13 is simply required to compensate for a decrease in the amount of charge due to, for example, leakage current from the thin-film transistor 21. In this case, the power circuit 34 simply supplies the scanning line driver circuit 13 with power necessary for such compensation, so that power consumption by the power circuit 34 is lower in the pause period than in the refresh period.

<2.3 Procedure for Image Display Process>

Figure 5:
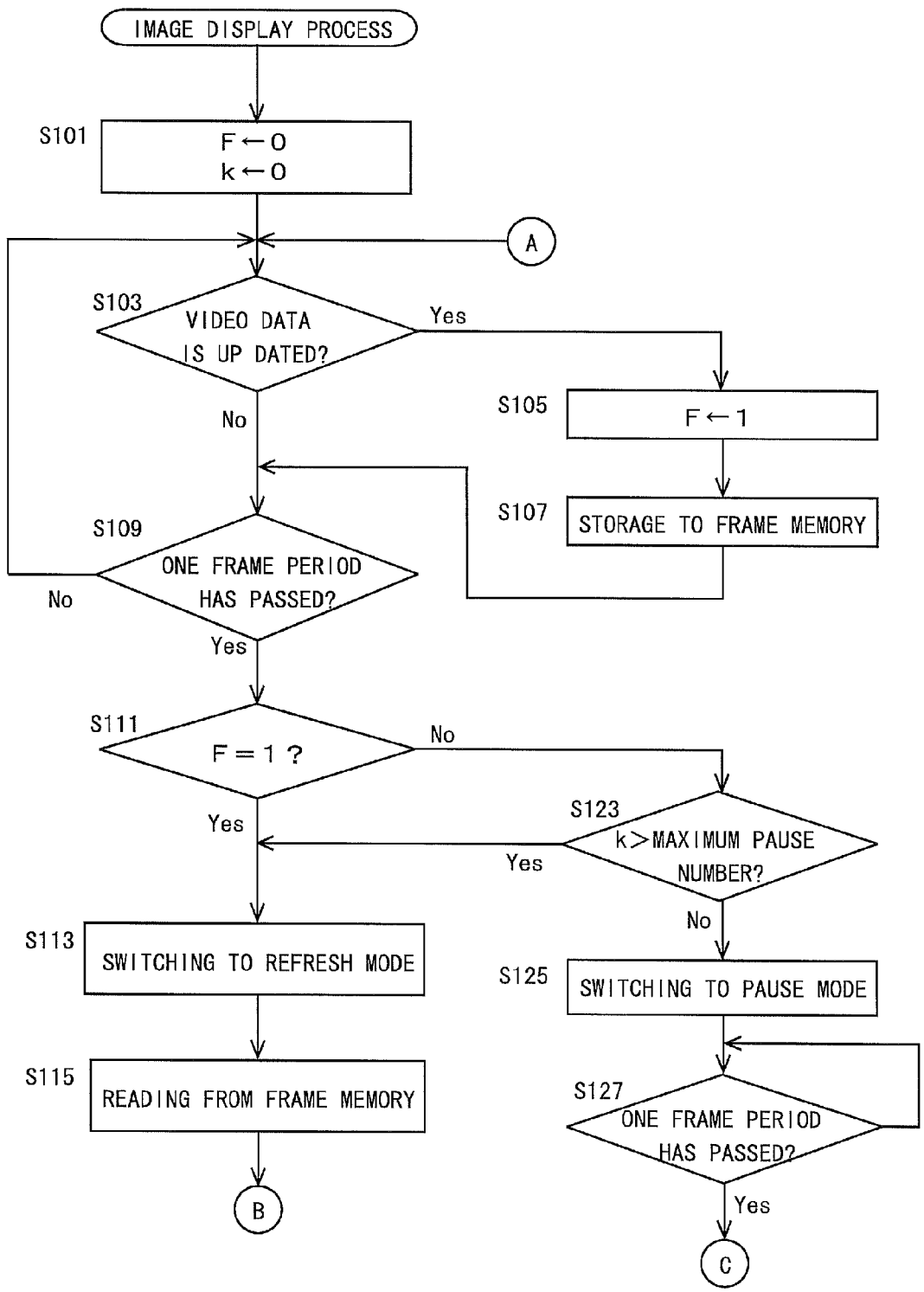
FIG. 5 is a flowchart showing a part of the procedure for an image display process by the liquid crystal display device shown in FIG. 2.
Figure 6:
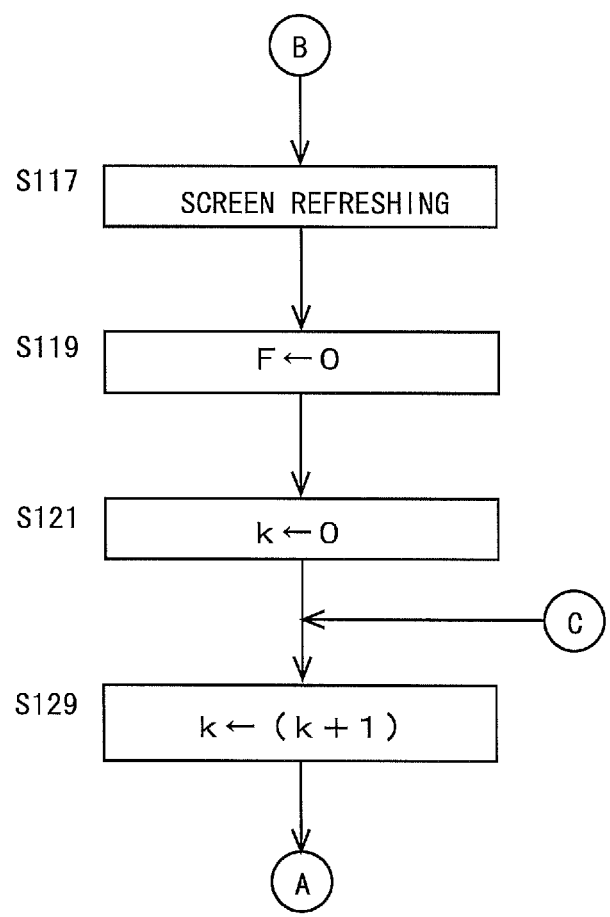
FIG. 6 is a flowchart showing the rest of the procedure for the image display process by the liquid crystal display device shown in FIG. 2.

FIGS. 5 and 6 are flowcharts showing the procedure for an image display process in the present embodiment. The display timing controller 31 operates as shown in FIGS. 5 and 6 in accordance with a predetermined program, so that the liquid crystal display device 10 can display an image that barely changes, such as a still image, with low power consumption. Note that the process shown in the timing chart to be described below is divided into processing tasks in a first frame period and processing tasks in a second frame period immediately thereafter.

In the first frame period, the display timing controller 31 sets the flag F of the latch circuit 35 to "0", which indicates that no updated video data has been received, and then resets a refresh pause number k memorized in the pause counter 37 (step S101).

Within the first frame period, the display timing controller 31 determines whether or not video data included in a received command is updated video data (step S103). As a result, the received video data is determined to be updated video data, the display timing controller 31 sets the flag F of the latch circuit 35 to "1" (step S105), and stores the received video data to the frame memory 36 (step S107) before advancing to step S109 to be described later.

Furthermore, when it is determined in step S103 that no video data has been received, the procedure advances to step S109. In step S109, it is determined whether or not one frame period has been completed. As a result, when it is determined that one frame period has not been completed yet, the procedure returns to step S103 described above, or when it is determined that one frame period has already been completed, the procedure advances to step S111. In the case where updated video data has been received within the first frame period as such, the video data is stored to the frame memory 36. The processing in steps S101 to S109 corresponds to the processing tasks in the first frame period.

Next, in step S111 at the beginning of the second frame period, the display timing controller 31 determines whether the flag F of the latch circuit 35 is "1" or not. As a result, when the flag F is determined to be "1", the procedure advances to step S113, or when the flag F is not "1", i.e., it is "0", the procedure advances to step S123 to be described later.

In step S113, the display timing controller 31 supplies necessary power to the power circuit 34, the scanning line driver circuit 13, the signal line driver circuit 14, and the memory access circuit 38, which are indispensable for screen refreshing, thereby switching to the refresh mode. Next, the display timing controller 31 controls the memory access circuit 38 in order to read video data from the frame memory 36 (step S115), and provides the video data being read to the signal line driver circuit 14 (step S117). As a result, screen refreshing starts at the beginning of the second frame period.

Upon completion of the refreshing in the second frame period, the display timing controller 31 sets the flag F of the latch circuit 35 to "0" (step S119), and resets the refresh pause number k in the pause counter 37 (step S121). Note that steps S113 to S117 are also referred to as first refreshing means.

On the other hand, when the flag F is determined in step S111 to be "0", the display timing controller 31 determines whether or not the refresh pause number k memorized in the pause counter 37 is greater than the preset maximum number of pauses (step S123). As a result, when the refresh pause number k is determined to be greater than the maximum number of pauses, the procedure advances to step S113 described above, where screen refreshing is performed. Screen refreshing is performed on the basis of video data received in a frame period preceding the first frame period.

Alternatively, when the refresh pause number k is determined to be less than the maximum number of pauses, the display timing controller 31 switches to the pause mode in which the D/A conversion circuit and the output buffer circuit in the signal line driver circuit 14 and the power circuit 34 are only provided with minimum necessary power to operate (step S125). Then, the procedure advances to step S129 after a wait for one frame period (the second frame period) to lapse (step S127). Note that step S125 is also referred to as first refresh pausing means.

In step S129, a value of 1 is added to the refresh pause number k to obtain a new refresh pause number k, and the new value is stored to the pause counter 37 (step S131) before the procedure returns to step S101 described above. The processing in steps S111 to S129 corresponds to the processing tasks in the second frame period.

<2.4 Effect>

In the present embodiment, the liquid crystal display device 10 can sequentially switch between screen refreshing and refresh pausing with simplified configuration circuits.

Furthermore, when a received command is determined to include no updated video data, screen refreshing is paused by not reading video data stored in the frame memory 36. As a result, the liquid crystal display device 10 can display an image that barely changes, with low power consumption.

Furthermore, when a received command is determined to include updated video data, screen refreshing is performed by reading video data stored in the frame memory 36. As a result, the liquid crystal display device 10 can perform screen refreshing at optimum times for video data that is updated at arbitrary times.

Furthermore, the channel layer of the thin-film transistor 21 included in the pixel circuit 20 of the liquid crystal display device 10 is made of an oxide semiconductor, such as IGZO, which is less prone to leakage current. Thus, the maximum number of pauses can be set to a higher value, resulting in a longer pause period, so that power consumption by the liquid crystal display device 10 can be reduced.

<2.5 Variants>

In the first embodiment, at the beginning of each frame period, it is determined whether a command that includes video data updated during an immediately preceding frame period has been received or not. However, the determination as to whether video data is updated or not may be made at intervals of arbitrary time periods corresponding to integral multiples of one frame period, e.g., every two frame periods. In this case, as in the case where whether video data included in a command is updated or not is determined every frame period, the liquid crystal display device 10 makes a determination at the beginning of a period immediately after a command that includes updated video data has been received, so that screen refreshing can be performed at optimum times for video data that is updated at arbitrary times.

Furthermore, in the first embodiment, to prevent reduction in display image quality, the refresh pause number k at which to consecutively pause screen refreshing is counted. However, instead of counting the refresh pause number k, a refresh pausing period for which to consecutively pause screen refreshing may be obtained.

3. Second Embodiment

A liquid crystal display device 10 according to a second embodiment of the present invention will be described. The liquid crystal display device 10 according to the present embodiment performs screen refreshing at a higher speed than the liquid crystal display device 10 according to the first embodiment. Since the liquid crystal display device 10 according to the present embodiment has the same configuration as the liquid crystal display device 10 according to the first embodiment, any block diagram illustrating the configuration and any description of the configuration will be omitted. Assuming that screen refreshing in the first embodiment is performed at cycles of 60 Hz (where one frame period is 16.7 msec), high-speed refreshing in the present embodiment is performed for the first 10 msec of a frame period, and the remaining 6.7 msec is a pause period. Note that these numerical values are examples and should not be construed as limiting the present invention.

<3.1 Operation of the Display Timing Controller>

Figure 7:
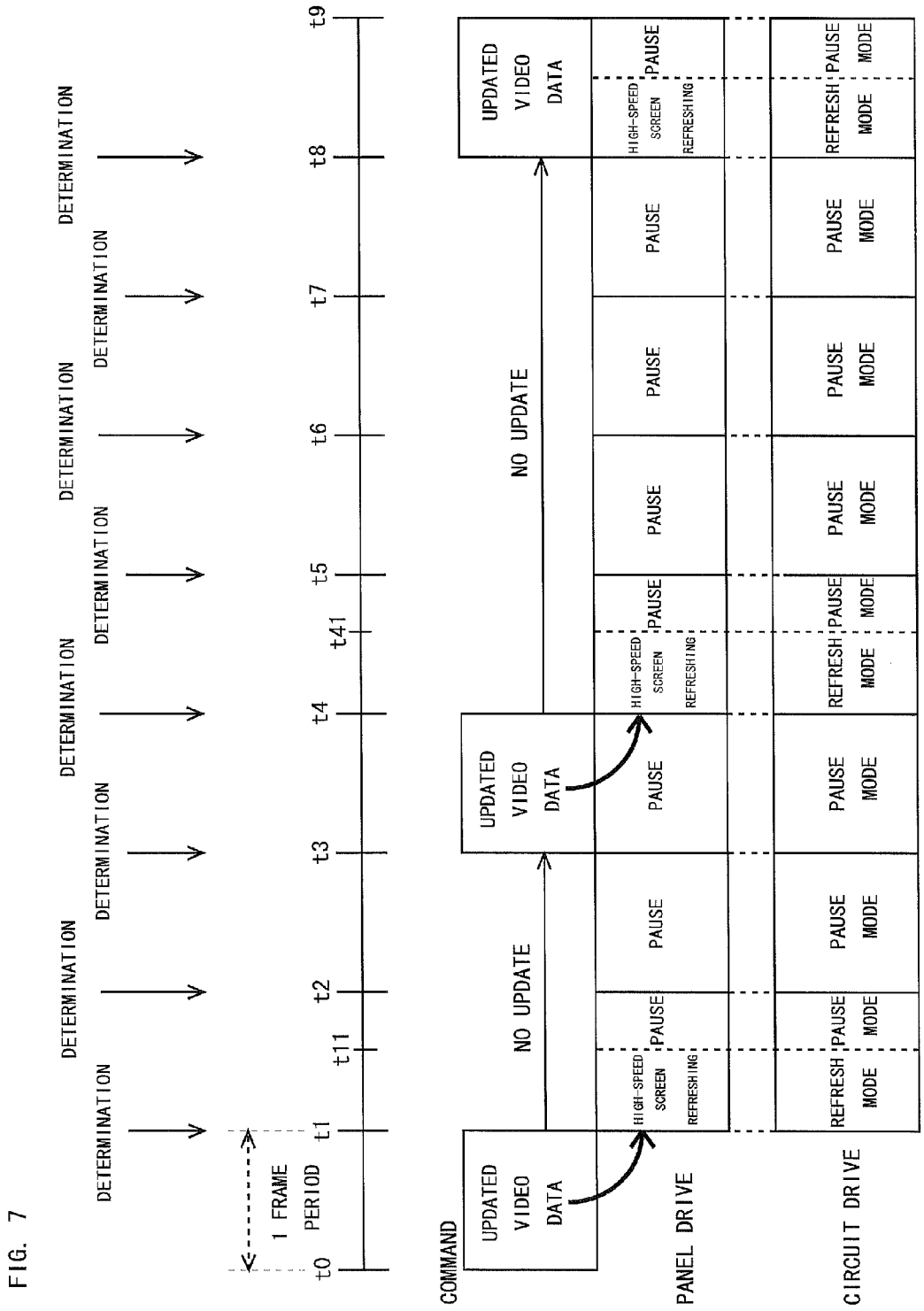
FIG. 7 is a diagram illustrating the relationship between updated video data included in a command transmitted by the host and screen refreshing in a second embodiment of the present invention.

FIG. 7 is a diagram illustrating the relationship between updated video data included in a command transmitted by the host 40 and screen refreshing. FIG. 7 corresponds to FIG. 3 described in the first embodiment, and therefore its differences from FIG. 3 will be mainly described.

FIG. 7 differs from FIG. 3 in that high-speed screen refreshing (high-speed refresh mode) is performed on the basis of updated video data. For example, upon reception of a command transmitted by the host 40 during the period between time t0 and time t1, the display timing controller 31 decodes the command. As a result, when the command includes updated video data, the flag F of the latch circuit 35 is set to "1", and the video data is stored to the frame memory 36, during the period between time t0 and time t1.

At time t1, when the display timing controller 31 detects that the flag F of the latch circuit 35 is "1", the display timing controller 31 controls the memory access circuit 38 so as to read the video data stored in the frame memory 36, and outputs the video data to the signal line driver circuit 14 and control signals C1 and C2 to the scanning line driver circuit 13 and the signal line driver circuit 14, respectively. As a result, on the basis of the video data received within the period between time t0 and time t1, screen refreshing starts at time t1, and an image based on the video data is displayed until time t11. At this time, the circuits shown in FIG. 4 that are indispensable for screen refreshing, including the scanning line driver circuit 13 and the signal line driver circuit 14, are driven in the refresh mode.

In this manner, unlike in the first embodiment, high-speed refreshing ends at time t11 between time t1 and time t2, and a pause period spans from time t11 to time t2. During the pause period, the image displayed by high-speed refreshing continues to be displayed. At this time, the analog circuits that need to operate in the pause period as well, including the D/A conversion circuit in the signal line driver circuit 14, are driven in the pause mode. In this case, for the liquid crystal display device 10, the period between time t1 and time t11 in which screen refreshing is performed in the high-speed refresh mode is 10 msec, and the pause mode period between time t11 and time t2 is 6.7 msec.

Likewise, high-speed screen refreshing based on video data received within the period between time t3 and time t4 starts at time t4 and ends at time t41 between time t4 and time t5, and the remaining period between time t41 and time t5 is the pause period.

The liquid crystal display device 10 does not receive a command that includes updated video data during the period between time t7 and time t8. However, as in the case shown in FIG. 3, when the number of pauses exceeds the maximum of 3, even if the display timing controller 31 does not receive any command that includes updated video data during the period between time t7 and time t8, screen refreshing is forcibly performed during the period between time t8 and time t9. Specifically, the display timing controller 31 reads again the video data received and stored to the frame memory 36 during the period between time t3 and time t4, and outputs the video data to the signal line driver circuit 14 and control signals C1 and C2 to the scanning line driver circuit 13 and the signal line driver circuit 14, respectively. As a result, the same image as in the pause period between time t7 and time t8 continues to be displayed thereafter. At this time, the circuits indispensable for screen refreshing, including the scanning line driver circuit 13 and the signal line driver circuit 14, are driven in the refresh mode.

Note that in the present embodiment, the circuits that need to be supplied with power in the high-speed refresh mode and/or the pause mode are the same as those shown in FIG. 4 that need to be supplied with power in the refresh mode and/or the pause mode, therefore, a diagram illustrating the relationship between the modes and the circuits that need to be supplied with power and any descriptions of the circuits will be omitted.

<3.2 Procedure for Image Display Process>

Figure 8:
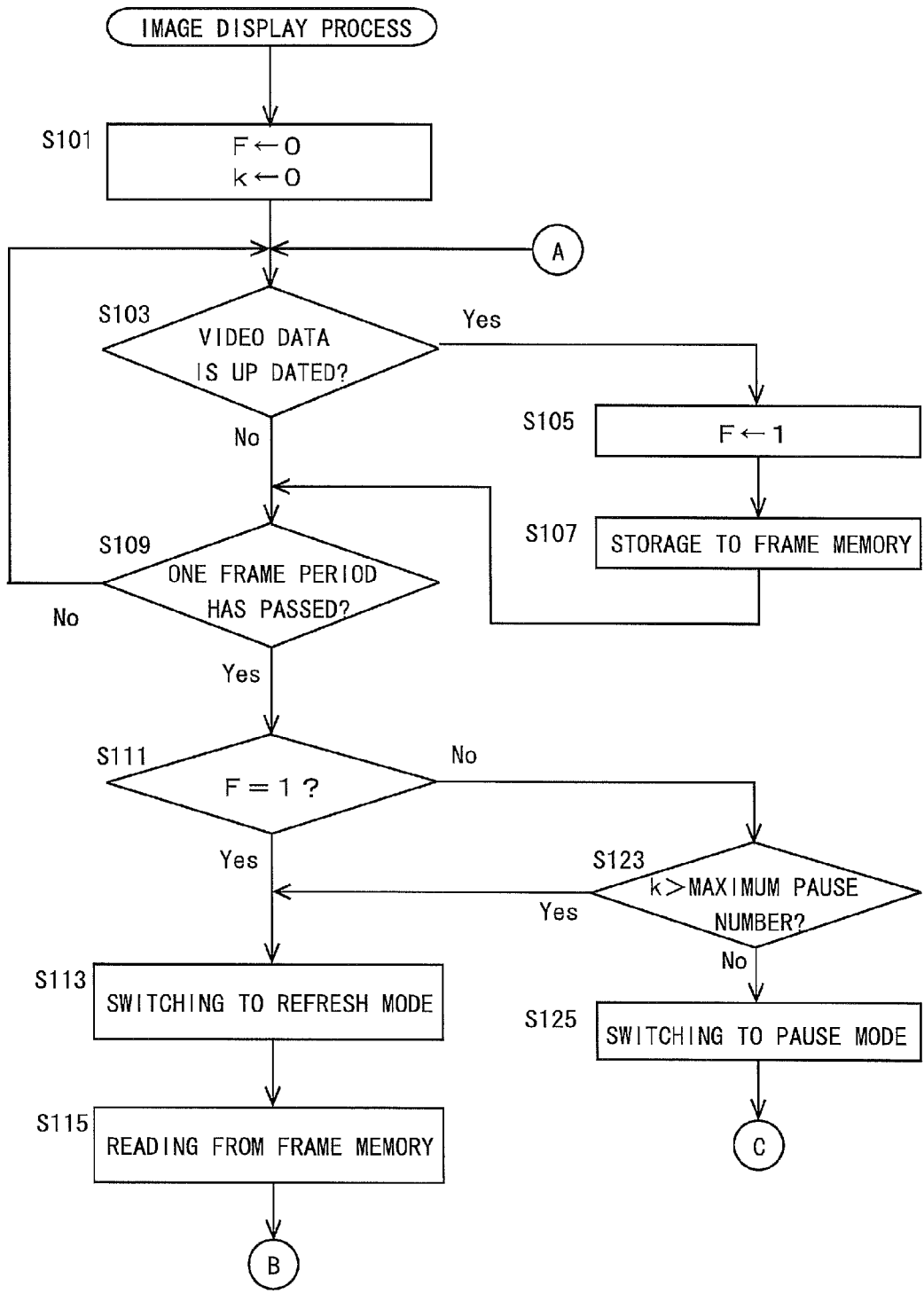
FIG. 8 is a flowchart showing a part of the procedure for an image display process by a liquid crystal display device according to the second embodiment.
Figure 9:
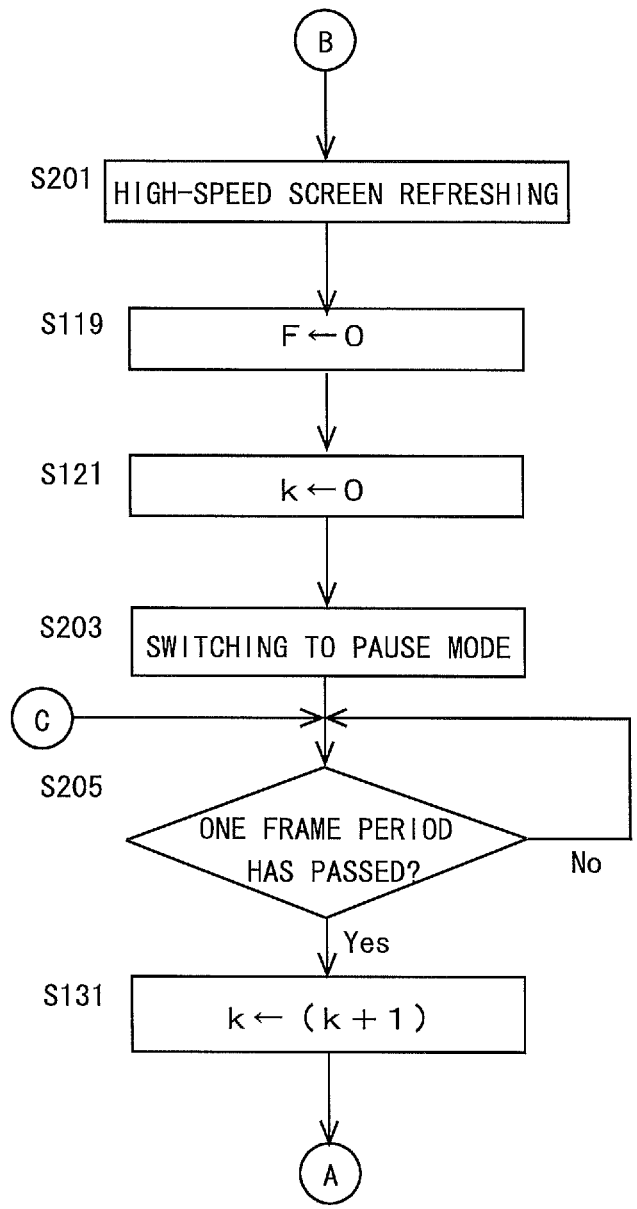
FIG. 9 is a flowchart showing the rest of the procedure for the image display process by the liquid crystal display device according to the second embodiment.

FIGS. 8 and 9 are flowcharts showing the procedure for an image display process in the present embodiment. The display timing controller 31 performs high-speed refreshing as shown in FIGS. 8 and 9 in accordance with a predetermined program, so that the liquid crystal display device 10 can display an image that barely changes, such as a still image, with lower power consumption. Note that the steps shown in FIGS. 8 and 9 that are the same as those shown in FIGS. 5 and 6 for the first embodiment are denoted by the same reference numerals and descriptions thereof will be omitted or otherwise briefly provided, so that different steps will be mainly described. Moreover, as in the first embodiment, the process shown in the timing chart to be described below is divided into processing tasks in a first frame period and processing tasks in a second frame period immediately thereafter. Specifically, the processing in steps S101 to S109 corresponds to the processing tasks in the first frame period, and the processing in and after step S111 corresponds to the processing tasks in the second frame period.

As shown in FIG. 8, steps S101 to S115, S123, and S125 are the same as those denoted by the same reference numerals in FIG. 5. Moreover, after switching to the pause mode in step S125, the procedure advances to step S205 to be described later.

In step S201, the display timing controller 31 performs high-speed screen refreshing. Then, as in the case shown in FIG. 6, the flag F of the latch circuit 35 is set to "0" (step S119), and the refresh pause number k in the pause counter 37 is reset (step S121). Note that steps S113, S115, and S201 are also referred to as second refreshing means.

Next, the display timing controller 31 switches to the pause mode (step S203), and waits for one frame period to lapse (step S205). As a result, when screen refreshing is performed in the high-speed refresh mode, the same image as in the high-speed refresh mode is displayed in the pause mode for the remaining period. Moreover, in the case where an image is displayed in the pause mode at the beginning of a frame period, the same image continues to be displayed until the end of that frame period. Note that step S203 is also referred to as second refresh pausing means.

After the lapse of one frame period in step S205, the refresh pause number k in the pause counter 37 is read and added to 1 to obtain a new refresh pause number k to be stored to the pause counter 37 (step S131), and the procedure returns to step S101 described above.

<3.3 Effect>

Upon determination that a received command includes updated video data, the liquid crystal display device 10 performs screen refreshing at high speed, and once the refreshing is complete, a pause in refreshing continues until the next frame period. As a result, the liquid crystal display device 10 can display an image represented by video data, with lower power consumption.

4. Third Embodiment

Figure 10:
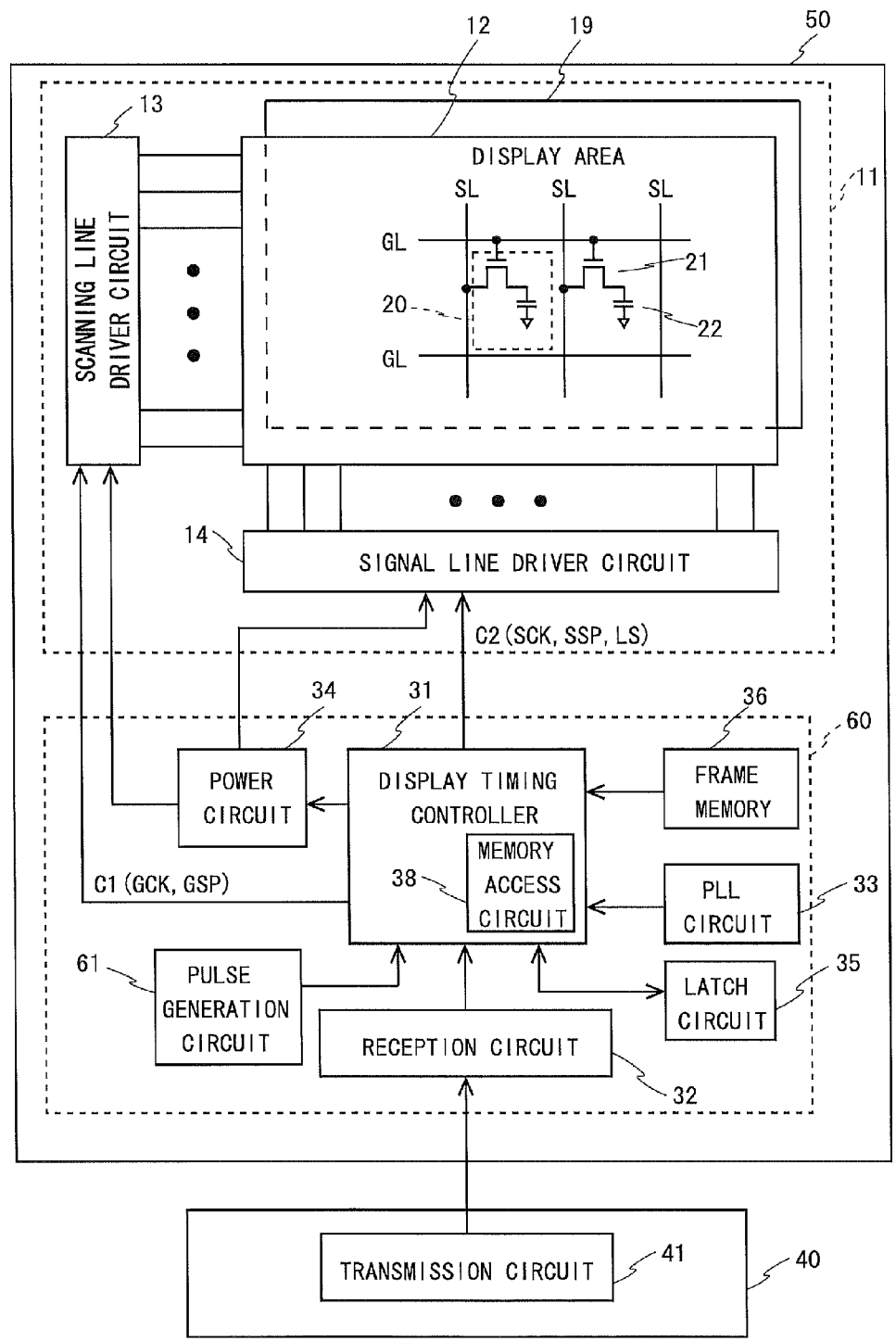
FIG. 10 is a block diagram illustrating the configuration of a liquid crystal display device according to a third embodiment.

FIG. 10 is a block diagram illustrating the configuration of a liquid crystal display device 50 according to a third embodiment of the present invention. Components of the liquid crystal display device 50 shown in FIG. 10 that are the same as those of the liquid crystal display device 10 shown in FIG. 2 are denoted by the same reference numerals, and different components will be mainly described.

As shown in FIG. 10, in place of the pause counter 37 of the liquid crystal display device 10 shown in FIG. 2, a pulse generation circuit 61 for generating and outputting a pulse every maximum pause period is provided on a control board 60 of the liquid crystal display device 50, and the pulse generation circuit 61 is connected to the display timing controller 31.

Figure 11:
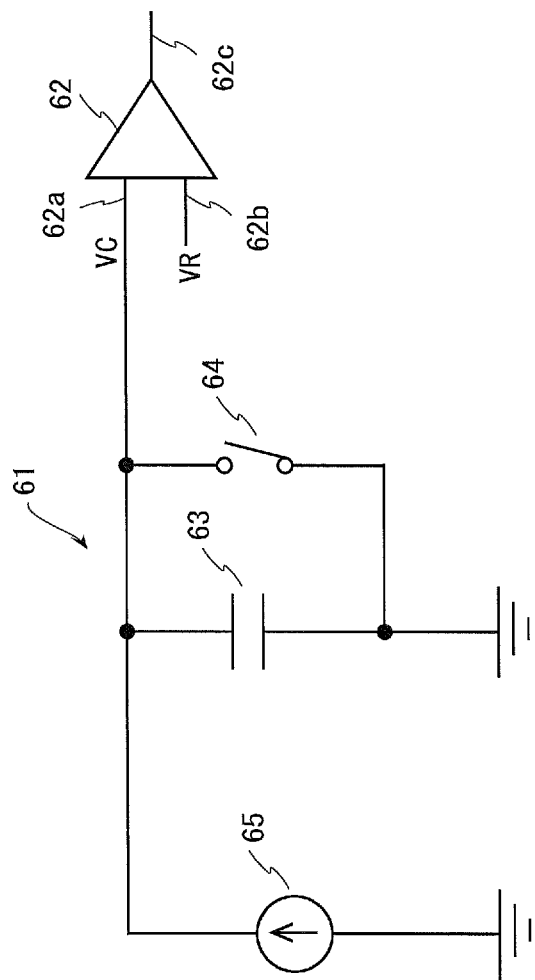
FIG. 11 is a circuit diagram illustrating the configuration of a pulse generation circuit included in the liquid crystal display device shown in FIG. 10.

FIG. 11 is a circuit diagram illustrating the configuration of the pulse generation circuit 61. As shown in FIG. 11, the pulse generation circuit 61 includes a comparator 62, which has an input terminal 62a connected to a first electrode of a capacitor 63 and a first terminal of a constant current source 65 and another input terminal 62b to which a reference voltage VR is inputted. A second electrode of the capacitor 63 and a second terminal of the constant current source 65 are grounded. Moreover, a switch 64 is provided in parallel with the capacitor 63, and the switch 64 is connected at one terminal to the first electrode of the capacitor 63 and at the other terminal to the second electrode.

In such a pulse generation circuit 61, the switch 64 is initially turned on to short-circuit the capacitor 63. As a result, a voltage VC of 0V is applied to the input terminal 62a of the comparator 62. In this case, the voltage VC applied to the input terminal 62a of the comparator 62 is lower than the reference voltage VR, so that no pulse is outputted to an output terminal 62c of the comparator 62.

Next, once the switch 64 is turned off, the capacitor 63 is charged by current supplied by the constant current source 65, so that the voltage VC applied to the input terminal 62a of the comparator 62 rises. Once the voltage VC applied to the input terminal 62a rises higher than the reference voltage VR, the comparator 62 outputs a pulse to the output terminal 62c. In this manner, the pulse generation circuit 61 outputs a pulse after a lapse of a predetermined period of time from the turning off of the switch 64.

Therefore, instead of the pause counter 37 counting the refresh pause number k until the maximum number of pauses is exceeded, the pulse generation circuit 61 is used with the period between the turning off of the switch 64 and the outputting of a pulse being preadjusted to be equal to the maximum pause period. As a result, even when no updated video data is received, it is possible to detect when to forcibly perform screen refreshing. Thus, even if the pause period lasts long, it is possible to prevent reduction in display quality caused by leakage current in the thin-film transistor 21 or leakage current due to impurities in the liquid crystal material.

Note that the period between the resetting of the pulse generation circuit 61 shown in FIG. 11 and the outputting of a pulse is adjusted by changing the value of current supplied by the constant current source 65 and the capacitance of the capacitor 63. Moreover, the pulse generation circuit 61 shown in FIG. 11 is illustrative, and any pulse generation circuit can be used so long as the timing of outputting a pulse is adjustable so as to coincide with the maximum pause period.

Note that the relationship between updated video data included in a command transmitted by the host 40 and screen refreshing in the present embodiment is the same as the relationship between updated video data included in a command transmitted by the host 40 and screen refreshing in the first embodiment shown in FIG. 3, therefore any diagram illustrating the relationship between updated video data and screen refreshing and descriptions of the relationship will be omitted.

Furthermore, in the present embodiment, the circuits that need to be supplied with power in the refresh mode and/or the pause mode are the same as those shown in FIG. 4 that need to be supplied with power in the refresh mode and/or the pause mode, therefore, a diagram illustrating the relationship between the modes and the circuits that need to be supplied with power and any descriptions of the circuits will be omitted.

<4.1 Procedure for Image Display Process>

Figure 12:
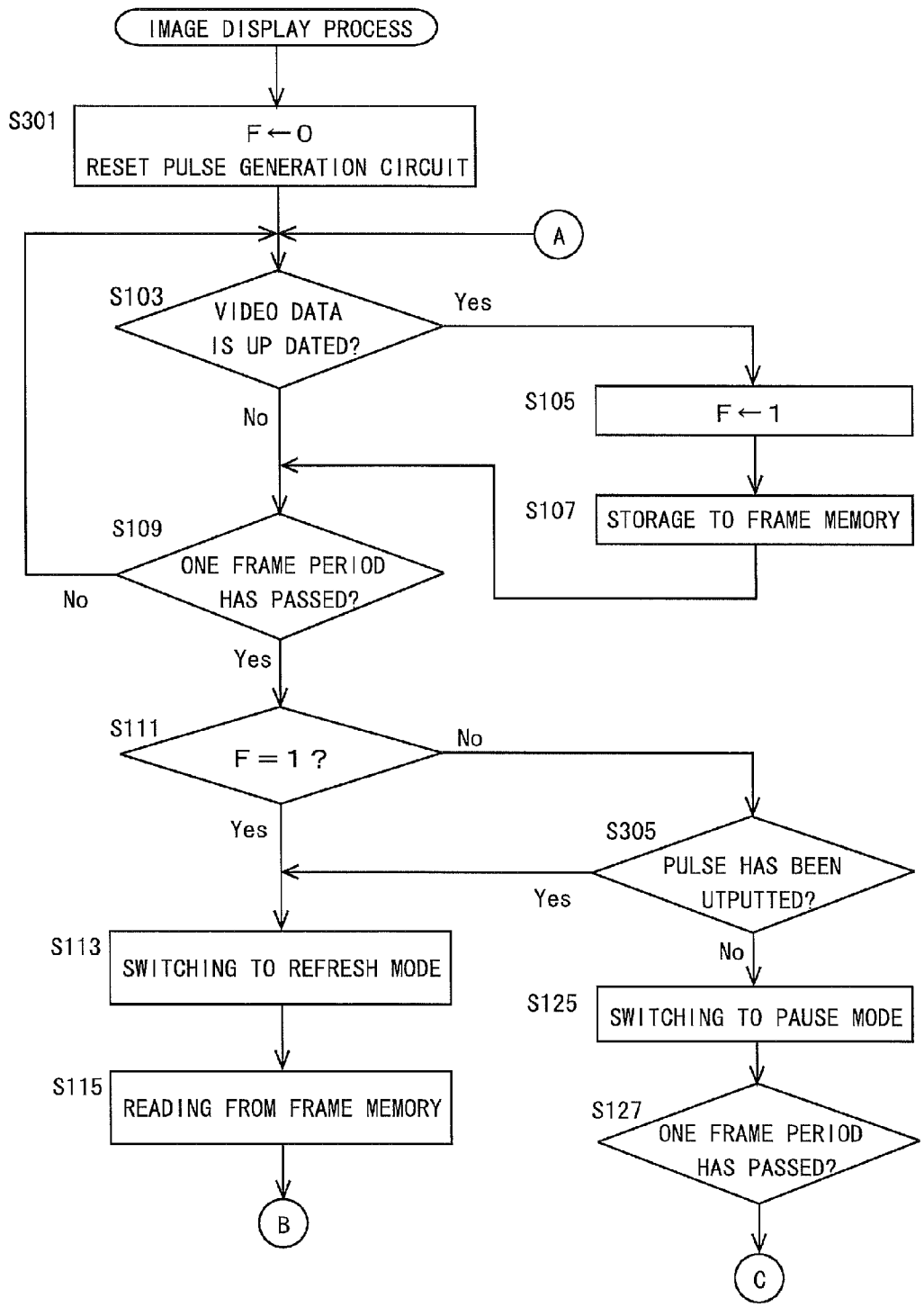
FIG. 12 is a flowchart showing a part of the procedure for an image display process by the liquid crystal display device shown in FIG. 10.
Figure 13:
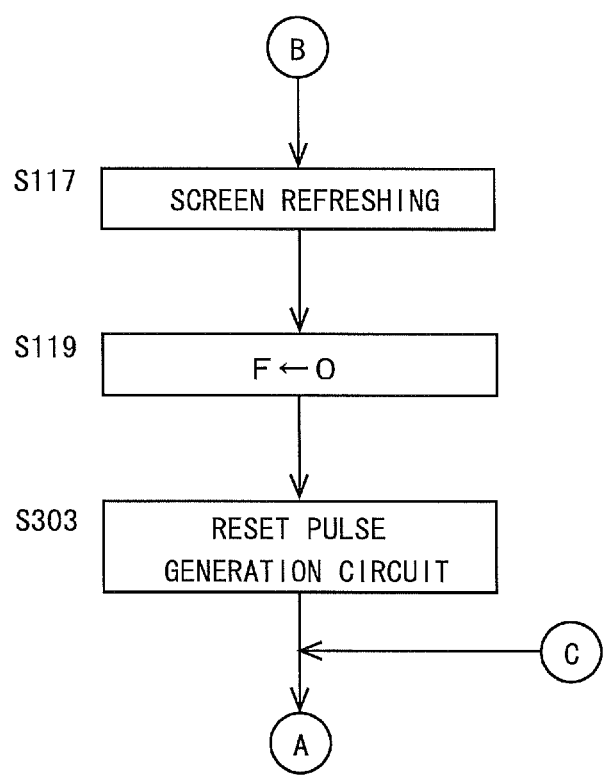
FIG. 13 is a flowchart showing the rest of the procedure for the image display process by the liquid crystal display device shown in FIG. 10.
Figure 14:
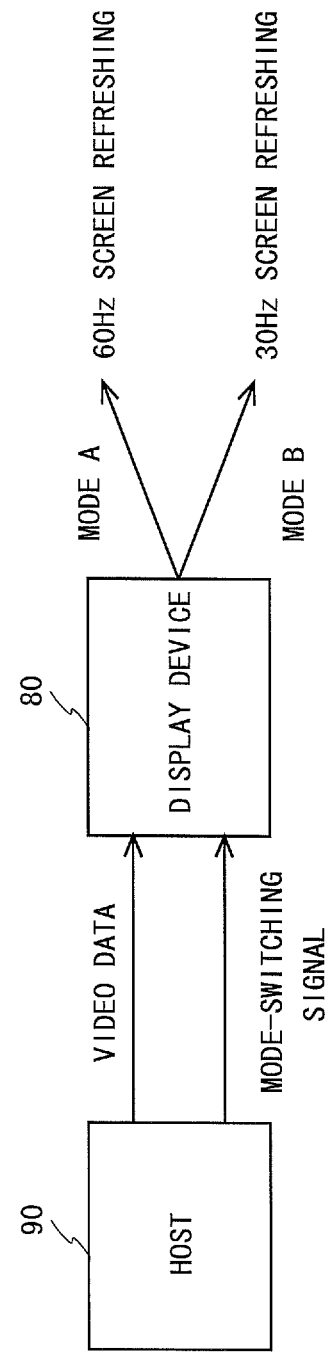
FIG. 14 is a diagram illustrating a conventional relationship between a host and a display device.

FIGS. 12 and 13 are flowcharts showing the procedure for an image display process in the present embodiment. The display timing controller 31 operates as shown in FIGS. 12 and 13 in accordance with a predetermined program, so that the liquid crystal display device 50 can display an image that barely changes, such as a still image, with low power consumption. Note that the steps shown in FIGS. 12 and 13 that are the same as those shown in FIGS. 5 and 6 for the first embodiment are denoted by the same reference numerals and descriptions thereof will be omitted or otherwise briefly provided, so that different steps will be mainly described. Moreover, as in the first embodiment, the process shown in the timing chart to be described below is divided into processing tasks in a first frame period and processing tasks in a second frame period immediately thereafter. Specifically, the processing in steps S101 to S109 corresponds to the processing tasks in the first frame period, and the processing in and after step S111 corresponds to the processing tasks in the second frame period.

As shown in FIGS. 12 and 13, in step S301, the flag F of the latch circuit 35 is set to "0", and the switch 64 of the pulse generation circuit 61 is turned on for reset. Subsequent steps S103 through S131, excluding steps S303 and S305, are the same as those shown in FIGS. 5 and 6. Therefore, the following description will be given mainly focusing on steps S303 and S305.

As in steps S117 and S119 shown in FIG. 6, screen refreshing is performed (step S117), and the flag F is set to "0" (step S119) prior to step S303 where the switch 64 of the pulse generation circuit 61 is turned on to reset the pulse generation circuit 61. As a result, the pulse generation circuit 61 outputs a pulse after a lapse of a preadjusted maximum pause period from the reset.

Furthermore, in step S305, to determine whether or not the maximum value of the pause period is exceeded, it is determined whether or not the pulse generation circuit 61 has outputted a pulse. As a result, when the determination is that a pulse has been outputted, it is determined that the maximum pause period is exceeded, and the procedure advances to step S113 for screen refreshing. Screen refreshing is performed on the basis of video data received during a frame period prior to the first frame period. Moreover, when the determination is that no pulse has been outputted, it is determined that the maximum pause period has not yet been reached, and the procedure advances to step S125 where screen refreshing is paused.

<4.2 Effect>

By providing the pulse generation circuit 61 for outputting a pulse every maximum pause period, so that screen refreshing is forcibly performed upon output of the pulse, it is rendered possible to prevent reduction in display image quality.

5. Others

Each of the liquid crystal display devices 10 and 50 in the above embodiments is configured such that the back of the liquid crystal display panel 11 is illuminated by backlight. However, the liquid crystal display panel may be of a reflective type. In the case of a reflective type, no backlight illumination is provided, resulting in reduced leakage current when the thin-film transistor provided in the pixel circuit is in OFF state. Accordingly, in the case where video data is not updated consecutively, the maximum number of pauses or the maximum pause period can be increased. Thus, power consumption by the liquid crystal display device can be further reduced.

Furthermore, while the above embodiments have been described taking the liquid crystal display devices 10 and 50 as examples, the present invention is not limited thereto. The present invention can also be applied to other display devices such as organic EL (electro luminescence) display devices.

INDUSTRIAL APPLICABILITY

The display device of the present invention has a pause mode and therefore can be used as a display device for displaying a still image with low power consumption.

DESCRIPTION OF THE REFERENCE CHARACTERS

10, 50 liquid crystal display device
11 liquid crystal display panel
13 scanning line driver circuit
14 signal line driver circuit
19 backlight unit
20 pixel circuit
21 thin-film transistor
30, 60 control board
31 display timing controller
32 reception circuit
34 power circuit
35 latch circuit
36 frame memory
37 pause counter
40 host
41 transmission circuit
61 pulse generation circuit
GL scanning line
SL signal line

The invention claimed is:

1. A display device that refreshes a screen on a display panel on the basis of video data included in an externally transmitted command, the device comprising:
a reception circuit for receiving the command;
a display timing control circuit having a function of determining whether or not the command includes updated video data every predetermined period;
frame memory for storing the updated video data when the command is determined to include the updated video data; a driver circuit for generating an image signal on the basis of the updated video data and outputting the image signal to the display panel along with a control signal, whereby the screen is refreshed, and
a power circuit for supplying necessary power to the driver circuit, wherein,
the display timing control circuit includes:
first refresh pausing means for pausing the refreshing of the screen in a second predetermined period immediately after a first predetermined period immediately preceding the time of determination that the command received during the first predetermined period includes no updated video data; and
first refreshing means for, when the command received is determined to include the updated video data, causing a memory access circuit to read the updated video data stored in the frame memory and output the updated video data to the driver circuit during the second predetermined period, whereby the screen is refreshed;
when pausing the refreshing of the screen, the display timing control circuit stops the memory access circuit and digital circuits included in the driver circuit from operating, and causes the power circuit and analog circuits included in the driver circuit to output less current than during the refreshing.

2. The display device according to claim 1, wherein,
the driver circuit includes a scanning line driver circuit and a signal line driver circuit,
the analog circuits included in the signal line driver circuit are a D/A conversion circuit and an output buffer circuit, and
the digital circuits included in the signal line driver circuit are a shift register circuit and a sampling latch circuit.

3. The display device according to claim 2, wherein, when pausing the refreshing of the screen, the display timing control circuit sets bias current in the analog circuits included in the signal line driver circuit to be lower than during the refreshing of the screen.

4. The display device according to claim 1, further comprising a pause counter for counting the number of consecutive pauses in the refreshing of the screen, wherein,
when the number counted by the pause counter exceeds a maximum pause number preset as a maximum possible number of consecutive pauses, the display timing control circuit forcibly refreshes the screen regardless of whether or not the updated video data has been received.

5. The display device according to claim 1, further comprising a pulse generation circuit for generating and outputting a pulse to the display timing control circuit every maximum pause period for which the refreshing of the screen is pausable, wherein,
when the pulse generation circuit outputs the pulse, the display timing control circuit forcibly refreshes the screen regardless of whether or not the updated video data has been received.

6. The display device according to claim 1, wherein, when pausing the refreshing of the screen, the memory access circuit pauses the reading of the updated video data stored in the frame memory.

7. The display device according to claim 1, wherein,
the display panel includes a plurality of pixel circuits arranged in a matrix, and
the pixel circuits include thin-film transistors with their channel layers made of an oxide semiconductor.

8. The display device according to claim 7, wherein,
the oxide semiconductor is mainly composed of indium (In), gallium (Ga), zinc (Zn), and oxygen (O).

9. The display device according to claim 7, further comprising a backlight unit for illuminating the display panel from its back surface.

10. The display device according to claim 1, wherein the video data included in the command is updated irregularly.

11. The display device according to claim 1, wherein the predetermined period is a period necessary for updating one screen or an integral multiple of the period necessary for the updating.

12. The display device according to claim 1, wherein the command is transmitted to the display device by an external host processor connected to the display device via a high-speed serial interface.

13. The display device according to claim 1, wherein, when pausing the refreshing of the screen, the display timing control circuit sets a clock frequency of the power circuit to be lower than during the refreshing of the screen.

14. A display device that refreshes a screen on a display panel on the basis of video data included in an externally transmitted command, the device comprising:
- a reception circuit for receiving the command;
- a display timing control circuit having a function of determining whether or not the command includes updated video data every predetermined period;
- frame memory for storing the updated video data when the command is determined to include the updated video data;
- a driver circuit for generating an image signal on the basis of the updated video data and outputting the image signal to the display panel along with a control signal, whereby the screen is refreshed, and
- a power circuit for supplying necessary power to the driver circuit, wherein,
- the display timing control circuit includes:
  - first refresh pausing means for pausing the refreshing of the screen in a second predetermined period immediately after a first predetermined period immediately preceding the time of determination that the command received during the first predetermined period includes no updated video data;
  - second refreshing means for, when the command received during the first predetermined period is determined to include the updated video data, causing the memory access circuit to read the updated video data stored in the frame memory and outputting the updated video data to the driver circuit during the second predetermined period, whereby the screen is refreshed in a shorter period than the second predetermined period; and
  - second refresh pausing means for pausing the refreshing of the screen for the rest of the second predetermined period after the refreshing by the second refreshing means;
- when pausing the refreshing of the screen, the display timing control circuit stops the memory access circuit and digital circuits included in the driver circuit from operating, and causes the power circuit and analog circuits included in the driver circuit to output less current than during the refreshing.

15. A method for driving a display device that refreshes a screen on a display panel on the basis of video data included in an externally transmitted command, the method comprising a step of making a determination in a first predetermined period as to whether or not the command received during the first predetermined period includes updated video data;
- when the updated video data is determined to be not included in the command by the step of making a determination, the method including steps of:
  - pausing a refreshing of the screen in a second predetermined period immediately after the first predetermined period, and
  - when pausing the refreshing of the screen, stopping a memory access circuit and digital circuits included in a driver circuit from operating, and causing a power circuit and analog circuits included in the driver circuit to output less current than during the refreshing,
- when the updated video data is determined to be included in the command by the step of making a determination, the method including the steps of:
  - causing the memory access circuit to read the updated video data during the second predetermined period, the data being stored to frame memory during the first predetermined period; and
  - outputting the video data being read, along with a control signal, to the driver circuit for driving the display panel, whereby the screen is refreshed.

* * * * *